June 8, 1937.  L. E. BARTON ET AL  2,083,357
MUTUAL CONDUCTANCE METER
Filed May 27, 1933

INVENTORS:
Carl C. Chambers,
Loy E. Barton,
BY J. R. Goldsborough
HIS ATTORNEY.

Patented June 8, 1937

2,083,357

UNITED STATES PATENT OFFICE 2,083,357

MUTUAL CONDUCTANCE METER

Loy E. Barton, Collingswood, N. J., and Carl C. Chambers, Lansdowne, Pa., assignors to Radio Corporation of America, a corporation of Delaware Application May 27, 1933, Serial No. 673,198

17 Claims. (Cl. 250—27.2)

Our invention relates to measuring instruments and particularly to an instrument for measuring the mutual conductance of vacuum tubes.

The mutual conductance meters now in general use are operated by direct current, making necessary either the use of batteries or expensive filters. The vacuum tube test sets using raw alternating current give an arbitrary reading of plate current which indicates only roughly the condition of the vacuum tube. A further difficulty with present test sets is that the meter required for reading the plate current is necessarily an expensive one.

An object of our invention is to provide an alternating-current operated meter which will give an accurate measure of the mutual conductance of a vacuum tube.

A further object of our invention is to provide an accurate mutual conductance meter which is comparatively cheap to manufacture.

A still further object of our invention is to provide a mutual conductance meter having a dial which is easy to read.

In practicing our invention, we provide a plurality of transformer windings which supply to the tube under test, voltages having peak values equal to the rated direct-current voltages for the tube. The output of this tube is impressed upon a tuned circuit to which is coupled an indicating device. The grid bias of the tube and the current flow in the tuned circuit are controlled by a potentiometer to which is fastened a dial rotatable with the potentiometer arm and reading directly in mutual conductance units.

Figure 1:
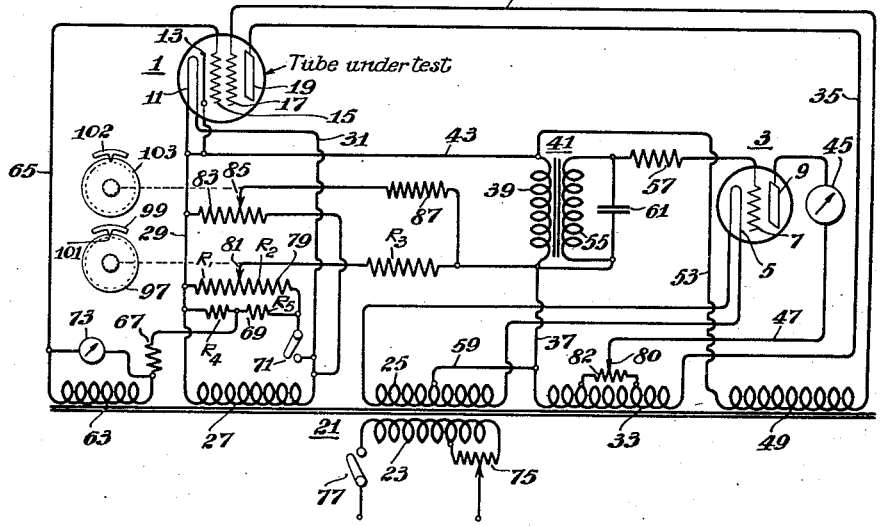
Figure 2:
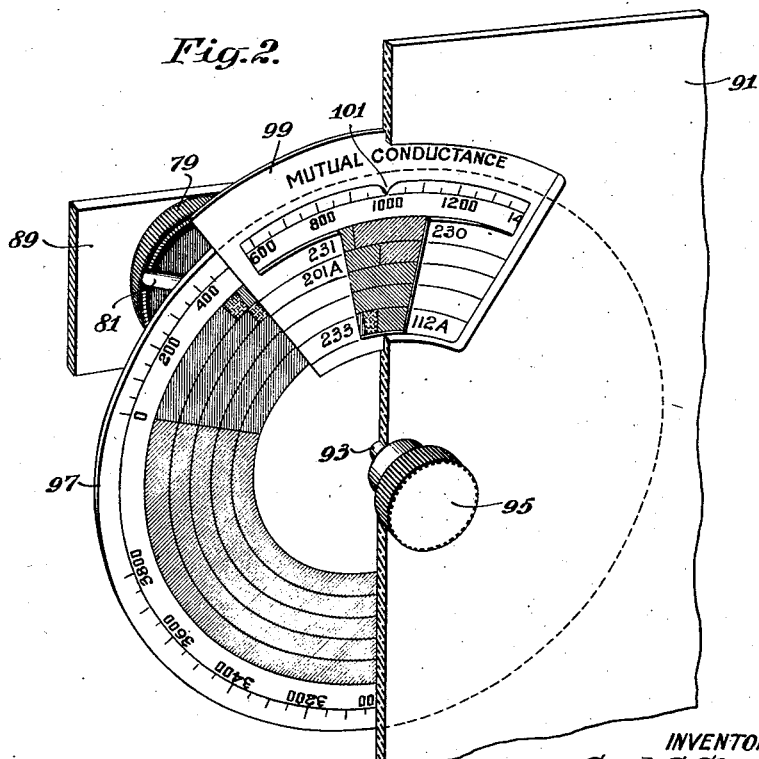

Other features and advantages of our invention will appear from the following description taken in connection with the accompanying drawing in which Figure 1 is a circuit diagram of one embodiment of our invention; and Fig. 2 is a perspective view of our improved dial and certain associated apparatus used with the circuit shown in Fig. 1.

Referring to Fig. 1, the vacuum tube 1 under test is shown in the upper left hand corner of the diagram. The vacuum tube 3 shown at the right of the diagram is a unit of a vacuum tube volt meter and forms a permanent part of the mutual conductance meter. Tube 3 comprises a cathode 5, a control grid 7, and a plate 9. The tube 1 shown under test in Fig. 1 has a heater filament 11, an indirectly heated cathode 13, a control grid 15, a screen grid 17, and a plate 19.

The proper voltages for the vacuum tubes 1 and 3 are supplied by a plurality of secondary windings of a transformer 21 which has a primary winding 23 adapted to be connected to a suitable alternating current power supply such as the usual 110 volt line.

The cathode 5 of the meter tube 3 is supplied with heater current by means of the middle secondary winding 25. Heater current is supplied to the tube 1 under test by means of another secondary winding 27 which is connected to the heater filament 11 through the conductors 29 and 31. Proper taps may be provided on winding 27 to heat the cathode of tube 3, if preferred.

The plate potential is supplied to the vacuum tube 1 by means of the secondary winding 33 which has its right hand terminal connected to the plate 19 through a conductor 35. The left hand terminal of winding 33 is connected to the cathode 13 of tube 1 through a conductor 37, the primary 39 of an audio frequency transformer 41 (which couples the output electrodes of tube 1 to the input electrodes of tube 3), and a conductor 43. The plate circuit just traced has an impedance which is low compared with the plate impedance of tube 1.

The secondary winding 33 also supplies plate potential to the meter tube 3, the plate 9 of which is connected to a point on the winding 33 through a direct-current meter 45 and a conductor 47.

The proper screen grid potential is supplied to the vacuum tube 1 by means of the secondary winding 49 which has its right hand terminal connected to the screen grid 17 through the conductor 51. The left hand terminal of the winding 49 is connected to the cathode 13 of tube 1 through conductors 53 and 43.

The secondary winding 55 of the audio frequency transformer 41 is connected to the input electrodes of the meter tube 3, the upper terminal of the secondary being connected to the grid 7 through a resistor 57 of comparatively high resistance. The lower terminal of the secondary 55 is connected to the cathode 5 of tube 3 through conductors 37 and 59 and the secondary winding 25.

The secondary 55 of the audio transformer is tuned to the frequency, or approximately the frequency, of the power supply, (60 cycles in case a 60 cycle power supply is used) by means of a condenser 61 shunted across the secondary winding.

The proper grid potential is supplied to the control grid of the tube 1 by means of the secondary winding 63. The left hand terminal of the secondary winding 63 is connected to the control grid 15 through a conductor 65. The right hand terminal of the winding 63 is connected to the cathode 13 of tube 1 through a high resistance unit 67, through a grid biasing resistor R4 which is one section of a potentiometer 69, and through the conductor 29 to the cathode 13.

The potentiometer 69 comprises the resistance unit R4 and a resistance unit R5 which are connected across the secondary winding 27 when a switch 71 is closed.

It will be noted that a meter 73 is connected across the secondary winding 63. This is to enable the person testing the tube 1 to adjust a potentiometer 75 until the voltage supplied to the secondaries of transformer 21 has the correct value, such an adjustment being desirable because of variations in line voltages. By including the potentiometer 75 across only a few turns of the primary winding 23, a small value of resistance may be used so that the voltage drop through it will be small and will not vary greatly with different loads.

During a test, the voltage applied to the grid of the tube 1 will have one of two values. If the switch 71 is open, the value will be that of the voltage across the secondary winding 63, since there is no current flowing through the potentiometer 69, and no voltage drop in the resistor unit R4.

When the switch 71 is closed, current flows through the potentiometer 69 and the voltage drop in the resistor R4 is subtracted from the voltage across the secondary winding 63. Thus, for example, when the secondary winding 63 applies a negative potential to the grid 15, the voltage drop in the resistor R4 decreases this negative potential.

All of the secondary windings of the supply transformer 21 are wound in the same direction. Therefore, when positive potential is applied to the plates of the tubes 1 and 3 and to the screen grid of tube 1, a negative potential is applied to the control grid of tube 1. In other words, the voltages applied to the control grid 15 and to the plate 19 are 180 degrees out of phase.

It will be apparent that when the power supply switch 77 is closed, a pulsating current will flow in the plate circuit of the tube 1 through the primary winding of the audio frequency transformer 41. This current will consist of alternate half cycles of the 60 cycle current (assuming a 60 cycle supply is used), since no current will flow in the plate circuit while the plate is negative. The half sine-wave plate current will be transferred to the secondary 55 of the audio frequency transformer 41, and since the secondary is tuned to 60 cycles, only a 60 cycle voltage will be impressed upon the input electrodes of the tube 3.

Since the control grid 15 goes positive at the time the plate 19 goes negative, it is desirable to include the resistor unit 67 having a comparatively high resistance value to limit the flow of grid current. The resistor 67 also prevents a heavy flow of current in case the control grid 15 and cathode 13 become shorted or connected together.

From the above description it is apparent that when the supply switch 77 is closed, a 60 cycle pulsating current flows through the plate meter 45, the current being pulsating since an alternating voltage is impressed on plate 9. This current has a magnitude dependent upon the characteristics of the vacuum tube 1 under test. It will also be apparent that when the test switch 71 is closed, the voltage drop in the grid biasing resistor R4 causes a change in the current flowing through the plate meter 45, this change also being dependent upon the characteristics of the tube 1 under test. Knowing the change in grid voltage caused by closing switch 71, and knowing the resulting change in plate current, it is possible to determine the mutual conductance of the tube, since the mutual conductance equals $$G_m = \frac{\Delta I_p}{\Delta E_g} \text{ micromhos}$$

where $\Delta I_p$ is the change in plate current in microamperes, and $\Delta E_g$ is the change in grid voltage. Where alternating-current is used, this ratio is taken when the plate of the tube is positive.

The change in plate current is determined in terms of the resistance of a potentiometer 79, comprising arms $R_1$ and $R_2$, which is shunted across the potentiometer 69, these two potentiometers being shunted across the secondary winding 27 when the switch 71 is closed.

When the switch 71 is closed, current flows through potentiometer resistor 79 as well as through potentiometer resistor 69. The resulting voltage drop in the potentiometer resistor 79 causes a flow of current through the primary winding 39, which opposes the plate current flow of the tube 1 (assuming variable tap 81 is not at the extreme left-hand position). The circuit which induces this opposing current may be traced from the variable tap 81 on the potentiometer 79 through the resistance unit $R_3$, which has a high resistance value, through the primary winding 39, and through the conductors 43 and 29 to the left hand terminal of potentiometer 79.

That the voltage drop across the potentiometer section $R_1$ induces an opposing current flow in the primary winding 39, may be seen from the following considerations. Plate current from tube 1 flows through the primary winding 39 only when the plate 19 is positive. At this time the right hand terminal of the secondary winding 27 is positive so that the tap 81 of the potentiometer 79 is positive with respect to the left hand terminal of potentiometer 79. Therefore, current flow caused by the voltage drop in $R_1$ is from the tap 81 through resistor $R_3$, and from the lower terminal of the primary winding 39 towards the upper terminal of that winding. At this time, the plate current flow of tube 1 is from the cathode 13, through the conductor 43 to the upper terminal of the primary winding 39, and through the winding 39 toward its lower terminal.

The change in plate current caused by the change in grid voltage is determined by noting the reading of the plate current meter 45 when the test switch 71 is open, then closing the test switch 71 (which causes a change in the meter reading unless tap 81 happens to be set at the correct position), and then adjusting the tap 81 on potentiometer 79 until the reading of meter 45 has the original value. If the potentiometer 79 has been properly calibrated, the position of the tap 81 then gives the mutual conductance value directly. The reason for this will be explained more fully hereinafter.

Since the meter 45 is a very sensitive one, some form of adjustment is necessary to keep its pointer on the scale when tubes having widely different plate current values are tested. This adjustment is provided by the potentiometer 83 shunted across the secondary winding 27. The voltage drop across one section of the potentiometer 83 is impressed across the primary 39 of the audio transformer 41 by means of a circuit which may be traced from the variable tap 85, through a resistor 87, the primary winding 39, and the conductor 43, to the left-hand end of potentiometer 83.

It is obvious that potentiometer 83 causes a flow of current through the primary winding 39 opposed to the plate current of the tube 1 in the same manner as the flow of opposition current from potentiometer 69. It follows that by adjusting the tap 85, the pointer of the meter 45 may be brought to the desired test position for the tube under test.

Tube manufacturers publish charts showing what the mutual conductance of the different types of vacuum tubes should be when operated under normal or rated voltage conditions. These mutual conductance values apply only when certain specified voltages are on the tube elements, and in the charts these voltages are given as direct-current voltages.

In order to test the tubes under the conditions specified in these charts while using alternating-current for testing, in our above-described circuit the voltages applied to the tube electrodes (except the heater, which is supplied rated RMS voltage) are given peak values equal to the direct-current voltages specified in the charts. Then the mutual conductance reading obtained by our meter will be approximately the same as the chart value if the tube is in good condition. In effect, our meter determines the mutual conductance of a vacuum tube at the instant that the electrode voltages have their peak values.

It will now be shown that the potentiometer 79 may be calibrated linearly in terms of mutual conductance so that the position of tap 81 with respect to one end of the potentiometer gives a direct indication of the mutual conductance value. It will be assumed that the test switch 71 is open so that the grid voltage of tube 1 is the voltage across secondary winding 63, and that the tap 85 has been adjusted to bring the pointer of meter 45 to the test position. (At this test position the tube 3 has been adjusted to give best operation as a tube-volt-meter.) The variable tap 80 on the potentiometer 82 has previously been adjusted to make the maximum plate current through tube 3 the proper value. This adjustment is an ordinary tube-volt-meter adjustment and will be permanent until a characteristic of tube 3 has changed, or until tube 3 has to be replaced by a new tube.

The test switch 71 is now closed whereby the voltage drop across potentiometer section R4 is put in series with the voltage of secondary 63. This voltage drop in R4 represents the change in grid voltage or $\Delta E_g$.

The closing of test switch 71 causes an increase in plate current of tube 1 (ignoring the effect of potentiometer 79), as will be indicated by a decrease in the reading of meter 45, since the voltage drop in resistor R4 opposes the negative biasing voltage of secondary 63. The reading of meter 45 will decrease because the secondary 55 is so phased with respect to voltage applied to anode 9 that the voltage applied to grid 7 is negative when anode 9 is positive.

The phasing of the input voltage and plate voltage of tube 3 is not critical, although the adjustment just described is preferred for maximum sensitivity. If desired, resistor 57 may be shunted by a condenser so that grid 7 will always go negative and the reading of meter 45 will decrease with increase of the plate current of tube 1 no matter what the phasing is.

Switch 71 having been closed, the tap 81 of potentiometer 79 is next adjusted until the pointer of the meter 45 has been brought back to the test position. This means that the voltage drop in the potentiometer section $R_1$ is causing a flow of current (a "bucking" current) in the primary winding 39 which exactly balances the 60 cycle component of the increase in plate current caused by the change in grid voltage.

Viewed in another way, the energy supplied to the tuned secondary circuit by the "bucking" current due to potentiometer 79 is equal (and opposite in phase) to the energy supplied thereto by the increase in plate current of the tube under test. It is apparent that the energy supplied to the tuned secondary circuit by the tube under test is just one half the energy that would be supplied if both half cycles were flowing in the plate circuit instead of alternate half cycles. Therefore, the peak value of the balancing or "bucking" current must be multiplied by two in order to obtain the peak value of $\Delta I_p$ during the half cycle the plate is positive.

Let the peak voltage across secondary winding 27 be represented by V. Then $$\Delta E_g = V\left(\frac{R_4}{R_4+R_5}\right) \quad (1)$$

The resistance unit $R_3$ has such a high value of resistance compared with the rest of the resistance in the "bucking" current circuit (in comparison with $R_1$ in particular) that it forms practically the entire impedance of this circuit. Therefore, the peak current in microamperes flowing in the "bucking" circuit is equal to $$I_b = V\left(\frac{R_1}{R_1+R_2}\right)\frac{1}{R_3}(10^6) \quad (2)$$

As explained above, $$\Delta I_p = 2I_b = 2V\left(\frac{R_1}{R_1+R_2}\right)\frac{1}{R_3}(10^6) \quad (3)$$

Then, $$G_m = \frac{\Delta I_p}{\Delta E_g} = \frac{2V\left(\frac{R_1}{R_1+R_2}\right)\frac{1}{R_3}(10^6)}{V\left(\frac{R_4}{R_4+R_5}\right)} \quad (4)$$

$$= \frac{\frac{2R_1}{R_1+R_2}(10^6)}{R_3\frac{R_4}{R_4+R_5}} \quad (5)$$

$$= \frac{2(R_4+R_5)R_1(10^6)}{R_3 R_4(R_1+R_2)} \quad (6)$$

Let $$K = \frac{2(R_4+R_5)(10^6)}{R_3 R_4(R_1+R_2)} \quad (7)$$

Then $G_m = K R_1$ where K is a constant for a particular design (8)

It is apparent from the above calculations that if the potentiometer 79 has a linear resistance, it may be calibrated linearly in mutual conductance units.

The structure and arrangement of the dial and calibrated potentiometer 79 will be understood by referring to Fig. 2. The resistance element of potentiometer 79 is arranged in circular form, and mounted on a supporting member 89 at the rear of the vertical panel 91 of the complete mutual conductance meter. The variable tap or contact member 81 of the potentiometer 79 is fastened to a rotatable shaft 93 which extends through the vertical panel 91. A knob 95 is secured to the shaft 93 at the front of the panel 91 for operating the potentiometer tap 81.

A dial 97 is fastened to the shaft 93 at the rear of the panel 91 to rotate with the potentiometer contact member 81 for indicating the value of mutual conductance. The zero mark on the dial is set on the shaft at the same point as the arm 81. Near the outer edge, the dial 97 is marked in mutual conductance units reading from 0 to 3800. A shield 99, which is set into and supported by the panel 91, has a pointer or other fiduciary mark 101 which extends into an arc-shaped opening cut in the shield 99 and which pointer cooperates with the mutual conductance markings on the dial.

The meter may be designed to utilize substantially the entire scale of the dial when tubes having the highest mutual conductance are being tested. In equation (6) let $$\frac{R_1}{R_1+R_2} = \%P_1$$

and let $$\frac{R_4}{R_4+R_5} = K_1$$

Then $$G_m = \frac{2(\%P_1)(10^6)}{K_1 R_3} \qquad (9)$$

$\%P_1$ equals the percent of the resistance of potentiometer 79 connected across the "bucking" circuit. From an inspection of Fig. 2 it is apparent that $\%P_1$ also equals the percent of the dial scale that is used. Therefore, the maximum mutual conductance value that a meter will read is found by letting $\%P_1$ equal 1. Then $$G_m(max.) = \frac{2(10^6)}{K_1 R_3} \qquad (10)$$

The dial marking above described is satisfactory when the person testing the vacuum tubes knows what value of mutual conductance the tubes should have for satisfactory operation. In practice, however, the vacuum tubes often will be tested by unskilled operators. For this reason, the dial markings and shield structure described below are desirable.

Between the mutual conductance markings and the center of the dial there are a plurality of concentric rings, each ring being divided into segments having different colors. In the example illustrated, each ring has a red segment, an orange segment, a green segment, and a brown segment, occurring in the order named.

The shield has a keystone shaped opening below the arc shaped opening, so that the colored segments of the dial are visible as the dial is turned. The shield 99 also has a number of arcs which coincide with the arcs on the dial 97, the shield arcs having marked therein the type numbers of the standard vacuum tubes which will be tested during the normal use of the meter.

In using the colored portion of the dial, the operator refers to the shield arc which is marked with the type number of the tube under test. The potentiometer contact member 81 is then turned (the dial 97 being turned with it) until it is set at the point where the reading of meter 45 is the same whether the test switch 71 is open or closed. The operator then looks through the keystone opening at the colored segment of arc on the dial 97 corresponding to the above-mentioned shield arc, and is informed at a glance whether the tube is defective, questionable, or good. If either the red segment or the brown segment is in front of the shield opening, the tube is defective; if the orange segment is in front of the opening, the tube is questionable; while if the green segment is in front of the opening, the tube is good. It is only in rare cases that the brown segment will appear, showing that the mutual conductance of a tube is too high.

It will be understood that in practice a large number of vacuum tube sockets would be provided for tubes to be tested, although in Fig. 1 only the wiring for one such tube has been shown in order to simplify the diagram. Preferably, these vacuum tube sockets would be mounted below and in front of the vertical panel shown in Fig. 2. It is also evident that taps on the various secondary windings may be provided to supply the proper voltages to the various elements of any tube that may be tested. It should be noted that the peak A. C. voltage for the elements, except for the filament, is made equal to the desired D. C. potentials at which the mutual conductance of the tube is normally given by the manufacturer. Also, the proper peak grid voltage from winding 63 is made high by one half of the voltage across $R_4$ so that the average bias is the rated value. For filament type tubes an additional correction for bias is needed because of peak instantaneous filament voltages.

While the circuit illustrated applies voltages to grid and plate 180 degrees out of phase, it may be desirable to apply the voltages in phase for some tubes. In either case, the peak potentials on grid and plate will occur at the same instant.

From the foregoing description it will be apparent that even for measuring plate current, the resistance values of the potentiometers and resistance units, except 87 and $R_3$, are not critical. In one embodiment of our invention, however, the following values were found to be satisfactory: Potentiometer 79—400 ohms; $R_4$—100 ohms; $R_5$—650 ohms; and $R_3$—4000 ohms.

In the matter of measuring plate current, it has been found that the potentiometer device 83—85 may be provided with a calibrated indicating means in any suitable manner, or, for example, an indicating means of the type provided in connection with the potentiometer device 79—81.

As has hereinbefore been pointed out, the potentials derived from the potentiometer resistor 83 may be adjusted by movement of the potentiometer contact 85 to provide a bucking current in the winding 39 to equal the plate current, or to oppose the plate current to such a point that a desired zero reading is obtained in the meter 45 in the circuit of the present example.

This is true since the current flowing through resistor 87 is the current that bucks out that portion of the plate current which would overload the indicating device, so that this current is equal to the voltage determined by the percentage of the potentiometer 83—85 times the voltage developed across the winding 27. The current is, then, this voltage divided by the resistance on the resistor 87. This, then, is equal to the plate current plus the current necessary to give the zero reading on the indicator 45.

A calibrated dial, or other indicating means for the potentiometer contact 85, may be provided, although it is not ordinarily included in an apparatus of this character unless the additional cost is justified. However, it will be seen that, in any event, the position of the potentiometer contact 85 may be taken as an approximation of the plate current.

A suitable calibrated indicating means is shown diagrammatically in Fig. 1 at 102—103, in connection with the movable contact 85. In this arrangement the pointer 102 is fixed, while the dial 103, rotatable with movement of the contact 85, is calibrated in suitable units such as milliamperes for a direct reading of plate current of the tube under test.

The dial and pointer means, connected with the contact arm 81, is also indicated diagrammatically in Fig. 1.

It has also been found that the apparatus shown may further be simplified and the cost thereby reduced without appreciably affecting the accuracy or convenience of operation, by eliminating the volt meter 73 with which the voltage adjusting device 75 is associated.

Normally, as hereinbefore pointed out, as a preliminary adjustment before making a test, the input voltage to the test apparatus is adjusted to a predetermined constant value by means of the potentiometer device 75, the reading being obtained from the volt meter 73. If it is desired to omit the volt meter 73, or a similar separate voltage indicating device, the voltage may, however, be adjusted to a desired constant standard value by means of the adjusting device 75 by reading the indicating meter 45, with the contact 85 on potentiometer 83 in the extreme left hand position, as viewed in the drawing, and with switch 71 open. With the tube to be tested out of the socket, the potentiometer device 75 is then adjusted until the meter 45 reads a certain predetermined value which has been found to correspond to a correct input voltage for the test apparatus.

It will be seen that the current flowing in the plate circuit tube 3 is dependent upon the potentials applied to its plate, filament, and grid. Since this grid potential is determined by the position of the switch 71 and the potentiometer 85, it is necessary that these be in a zero position. The choice of these zero reading positions of 85 and 71 is arbitrary. However, as a matter of operating convenience, since the contact 81 is also variable, the zero position for adjusting the input voltage is most easily and accurately obtained as above described, by moving the contact 85 to the extreme zero or left hand position and by opening the switch 71 to remove the variable which would otherwise be introduced into the reading by variations in the positions of the contact 81.

Various other modifications may be made in our invention without departing from the spirit and scope thereof, and we desire, therefore, that only such limitations shall be placed thereon as are necessitated by the prior art and set forth in the appended claims.

We claim as our invention:

1. In a mutual conductance meter for vacuum tubes, means for applying alternating-current potentials to the grids and plates of said tubes approximately 180 degrees out of phase, means for changing the alternating-current potential on the grid whereby a change in plate current is produced, and means for utilizing said change in plate current to give a direct reading of mutual conductance corresponding to direct-current potentials applied to the tube electrodes.

2. In a mutual conductance meter for vacuum tubes, means for applying alternating-current potentials to the grid and plate of the tube under test so phased that the peak potentials occur at approximately the same instant, said potentials having a fixed frequency, a circuit tuned to said frequency, an indicating device connected to said tuned circuit, means for impressing the output energy of said tube upon said tuned circuit, means for changing the potential on said grid whereby said output energy is changed, means for impressing upon said tuned circuit balancing energy having said fixed frequency which is substantially 180 degrees out of phase with said tube output energy and which is equal to said change in tube output energy, and an indicating device associated with said last means.

3. A meter for determining the mutual conductance of a vacuum tube, said meter comprising means for supplying alternating-current voltages to the grid and plate of said tube so phased that the peak potentials occur at approximately the same instant, a circuit tuned to the frequency of said voltages, an indicating device connected to said tuned circuit, means for coupling the output circuit of said tube to said tuned circuit whereby the energy in the plate circuit of said tube is transferred to said tuned circuit, means for changing the potential on said grid a fixed amount whereby the energy transferred to said tuned circuit is changed, means for supplying to said tuned circuit energy which has the frequency of said voltages and which is approximately 180 degrees out of phase with the energy in the plate circuit whereby the energy change in said tuned circuit may be balanced, and an indicating device associated with said last means.

4. A meter for measuring the mutual conductance of a vacuum tube comprising means for changing the grid potential of said tube by a predetermined amount whereby a change in plate current is produced, and means for opposing said change in plate current, said means including a low impedance potentiometer arm in series with a relatively high impedance device.

5. A meter for measuring the mutual conductance of a vacuum tube comprising means for changing the grid potential of said tube by a predetermined amount whereby a change in plate current is produced, means for opposing said change in plate current, and a second means for opposing said change in plate current, said second means including a low impedance potentiometer arm in series with a relatively high impedance unit.

6. A meter for measuring the mutual conductance of a vacuum tube comprising means for supplying voltages to the grid and plate of said tube from an alternating current source, means for changing the value of the voltage applied to said grid by a certain amount whereby a change in plate current is produced, means for indicating said change in plate current, and means including a potentiometer connected to said alternating current source whereby unrectified alternating current flows therethrough for opposing said change in plate current.

7. A meter for measuring the mutual conductance of a vacuum tube comprising means for supplying alternating-current voltages to the grid and plate of said tube in a fixed phase relation, said voltages having a fundamental frequency, means for changing the grid potential of said tube a certain amount whereby a change in the fundamental frequency component of the plate current is produced, means for indicating said change, and means for producing in a bucking circuit a current having the same value as said change and for impressing it upon said indicator, said means including a low impedance potentiometer in series with a relatively high impedance unit, said series combination being in series with said bucking circuit.

8. A meter for measuring the mutual conductance of a vacuum tube comprising means for supplying alternating current voltages to the grid and plate of said tube in a fixed phase relation, a transformer having a primary winding in the plate circuit of said tube, the secondary of said transformer being connected to an indicating device, means for changing the grid potential of said tube a certain amount whereby a change in plate current is produced, and means comprising a variable source of potential connected in series with said primary winding for opposing said change in plate current.

9. A meter for measuring the mutual conductance of a vacuum tube comprising means for applying alternating voltages to the grid and plate of the tube which are out of phase approximately 180 degrees, means for indicating the resulting energy in the plate circuit of said tube, means for changing the value of the alternating voltage applied to the grid by an amount equal to a constant times the voltage of an alternating current source whereby the value of the plate circuit energy is changed, and means for adding to the plate circuit energy balancing energy whereby the sum of the changed plate circuit energy and the balancing energy can be made equal to said first-mentioned magnitude, said last means comprising a low resistance potentiometer having a voltage across it which is a constant times the voltage of said source, a portion of the plate circuit of the tube being connected in series with a high impedance unit, said portion and said high impedance unit being connected across an arm of said potentiometer.

10. A meter for determining the mutual conductance of a vacuum tube, said meter comprising means for impressing a fixed amount of alternating voltage from a source upon the control grid of said tube, a plate circuit for said tube including a source of alternating current and a transformer having a primary winding in series therewith, the voltage of said source being applied to said plate out of phase with the voltage applied to said grid, said transformer having a secondary winding connected to an indicator and tuned to the fundamental frequency of said source of alternating current, a source of alternating current of said fundamental frequency shunted by a potentiometer, means including a portion of said potentiometer for changing the grid voltage of said tube whereby the plate current through said transformer primary may be changed, and means comprising a portion of said potentiometer for impressing an additional potential across said transformer primary to bring the energy in said tuned secondary back to an initial value, said potentiometer being linear in value and being calibrated to show mutual conductance directly.

11. In a mutual conductance meter, means providing anode and grid circuits for connection with a vacuum tube device to be tested, means for supplying to said circuits alternating current at peak potentials substantially equal to the normal operating potentials for said device and so phased that in the anode and in one of said grid circuits the peak potentials occur at the same instant, an indicating device coupled to said anode circuit for receiving indications of changes in anode current therethrough, means for adjusting the flow of anode current in said circuit, means for causing a predetermined change in the flow of anode current in said circuit from an adjusted value, variable means for restoring said flow to said first-named value, and an indicating dial means connected with said last-named means for operation therewith.

12. In a mutual conductance meter for testing a vacuum tube, means for applying to the grid and plate of the tube alternating voltages of a certain frequency which are so phased that their peak potentials occur at the same instant, means for impressing the resulting energy in the plate circuit of said tube upon a circuit tuned to said certain frequency, means for changing the value of the alternating voltage applied to the grid by a fixed amount whereby the value of the plate circuit energy is changed, and means for impressing upon said tuned circuit energy which is in phase opposition to said plate circuit energy and of the same magnitude as said change in plate circuit energy, said last means including a circuit having in series therewith a potentiometer arm which has low impedance compared with the impedance of said last-named circuit.

13. In a mutual conductance meter for testing a vacuum tube, means for applying to the grid and plate of the tube alternating voltages of a certain frequency which are so phased that their peak potentials occur at the same instant, means for impressing the resulting energy in the plate circuit of said tube upon a circuit tuned to said certain frequency, means for changing the value of the alternating voltage applied to the grid by a fixed amount whereby the value of the plate circuit energy is changed, and means for impressing upon said tuned circuit energy which is in phase opposition to said plate circuit energy and of the same magnitude as said change in plate circuit energy, said last means including a circuit having in series therewith a potentiometer arm which has low impedance compared with the impedance of said last-named circuit, said potentiometer arm being circular in form and having a mutual conductance indicating dial in the form of a circular plate connected thereto for adjustment therewith.

14. In a mutual conductance meter, a common source of alternating current including a supply transformer having windings which when energized provide peak alternating potentials substantially equal to the normal operating potentials required for a vacuum tube to be tested, a cathode supply lead, an anode, grid and anode circuits connected with said windings to receive said potentials in substantially opposite phase relation to each other, a vacuum tube voltmeter, a coupling device therefor in said anode circuit, potentiometer means connected with one of said windings and at one terminal thereof with one terminal of the coupling device and the cathode lead, a switch in circuit between the opposite terminal and the last-named winding, a tap on said potentiometer means for the grid circuit, a second tap on said potentiometer means connected with the opposite terminal of the coupling device, and a calibrated dial means connected with said tap to move therewith.

15. The method of employing apparatus including a tuned circuit for determining the mutual conductance of a vacuum tube, said circuit being tuned to a certain frequency, which method comprises applying to the grid and plate of the tube alternating voltages of said certain frequency which are so phased that their peak potentials occur at the same instant, impressing the resulting energy in the plate circuit of said tube upon said tuned circuit, changing the value of the alternating voltage applied to the grid by a fixed amount whereby the value of the plate circuit energy is changed, impressing upon said tuned circuit other energy which is in phase opposition to said plate circuit energy and of the same magnitude as said change in plate circuit energy, and producing an indication proportional to said other energy which indication is a measure of said mutual conductance.

16. In combination, a socket for a vacuum tube to be tested, means for supplying to the terminals of said socket alternating voltages having peak values equal to the rated direct-current voltages for said tube, and means for obtaining a direct reading of the mutual conductance of said tube, said reading having an accuracy approximately the same as the accuracy of a measurement made with said rated direct-current voltages applied to said tube.

17. In a testing device for electric discharge devices, means including transformer windings providing testing potentials for application to the electrodes thereof in a predetermined phase relation in accordance with a normal operating condition, an electrical indicating device including a meter, means providing an anode circuit for said electric discharge device to be tested, a coupling device between said anode circuit and said electrical indicating device, a potentiometer device having an impedance element connected with an alternating current supply winding and having a movable contact connected with said anode circuit whereby an alternating current in opposition to a normal anode current may be applied thereto, and the impedance of said potentiometer device being so related to the impedance of the anode circuit that an indication of the anode current is established by the adjusted position of the potentiometer contact when a predetermined reading is obtained on the meter in the input indicating device.

LOY E. BARTON.
CARL C. CHAMBERS.